Figure 1:
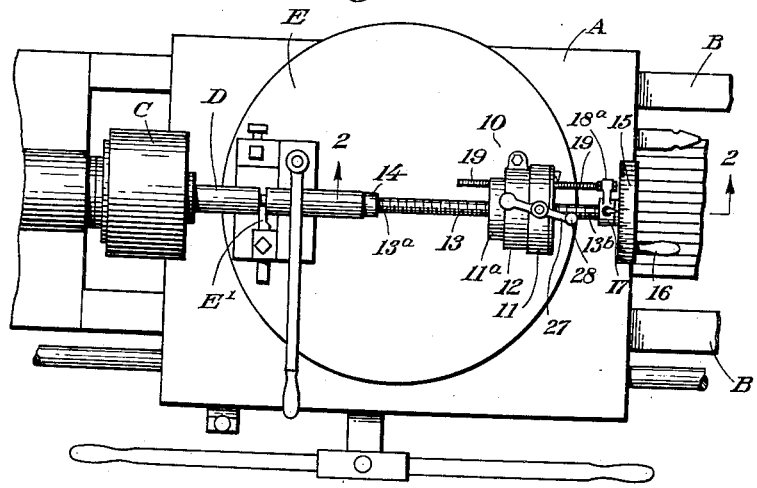

Dec. 24, 1940.    D. FIELD    2,226,055
ADJUSTABLE CUTOFF STOP
Filed March 25, 1940    2 Sheets-Sheet 1

David Field,
INVENTOR
BY Victor J. Evans & Co.
ATTORNEYS

Dec. 24, 1940.     D. FIELD     2,226,055
ADJUSTABLE CUTOFF STOP
Filed March 25, 1940     2 Sheets-Sheet 2
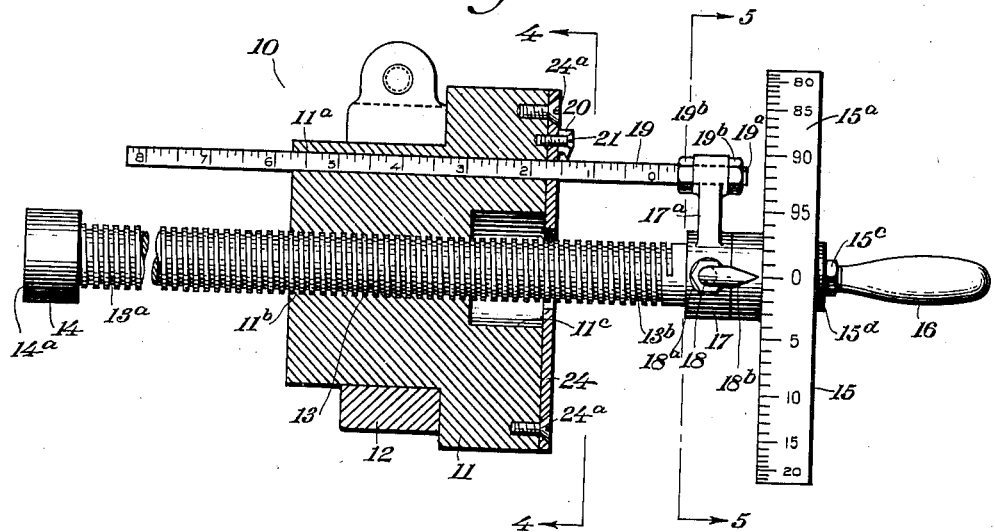
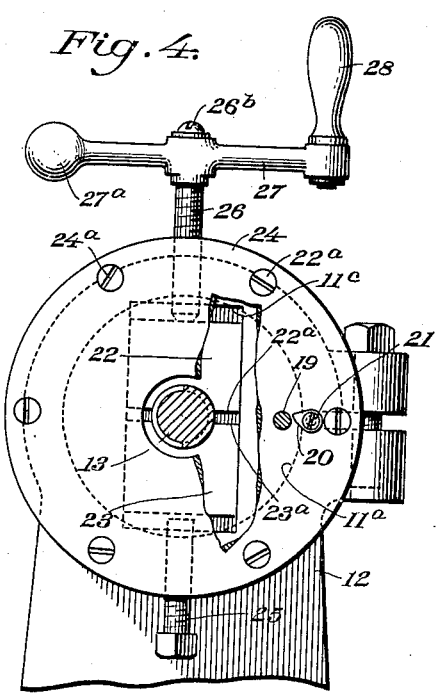
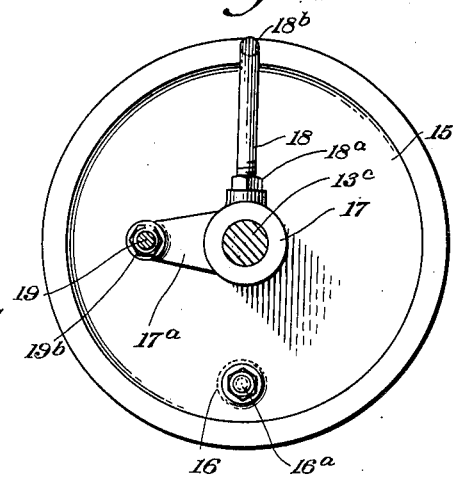
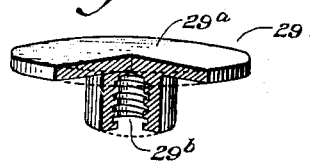
David Field:
INVENTOR Patented Dec. 24, 1940

2,226,055

UNITED STATES PATENT OFFICE 2,226,055

ADJUSTABLE CUTOFF STOP

David Field, Auburn, N. Y.

Application March 25, 1940, Serial No. 325,903

4 Claims. (Cl. 29—57)

This invention relates to improvements in devices useful in conjunction with lathes or similar machines and especially is concerned with a novel adjustable cutoff stop, particularly useful in conjunction with a Jones and Lamson turret lathe of the type wherein stock to be cut off is fed automatically through the chuck.

It is an object of this invention to provide an adjustable calibrated stock movable along an axis co-incidental with the axis of rotation of material held in a lathe chuck and which may be mounted in the tool holder of a turret lathe to provide a stop or limit of feed of stock from the lathe chuck into the cutoff mechanism.

Another object of this invention is to provide a readily adjustable device which can easily be constructed with requisite accuracy for furnishing a stop which can be used in conjunction with rod or tubular stock when the stock is being cut off in predetermined lengths on an automatic feed lathe.

Another object of this invention is to provide an adjustably extensible stock stop useful with an automatically fed cutoff lathe whereby the stop may not only be rigidly set within extremely small tolerances but may also be locked in set position by means which cause no movement of the stop from the selected adjustment.

An advantage of the novel adjustable cutoff stop according to this invention is that it can be easily and quickly connected to or disconnected from, as occasion may require, the tool holder of a lathe turret, thus facilitating ready change-over of the lathe from use as a cutoff machine to other uses.

Noteworthy among the features of the novel cutoff stop according to the present invention are its simplicity and ruggedness of construction, the former suiting the device to the requirements of manufacture under conditions of mass production and the latter assuring long useful life.

Other objects, advantages and features of the new and improved adjustable cutoff stop according to the present invention will be apparent to those skilled in this art during the course of the following description.

Regarded in certain of its broader aspects the novel adjustable stock stop according to this invention comprises a box suited to be mounted upon the tool holder of a lathe, a threaded opening extending horizontally through said block, a threaded rod extending through said opening and projecting at each end from said block, a first plate stop carried on one end of said rod, a peripherally calibrated wheel mounted on the opposite end of said rod, and a scale slidingly mounted within parts of said block and connected to said rod, and indexes functioning in conjunction with said scale and the calibrated periphery of said wheel whereby axial motion of the rod within the block can be determined and controlled with accuracy.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Figure 2:
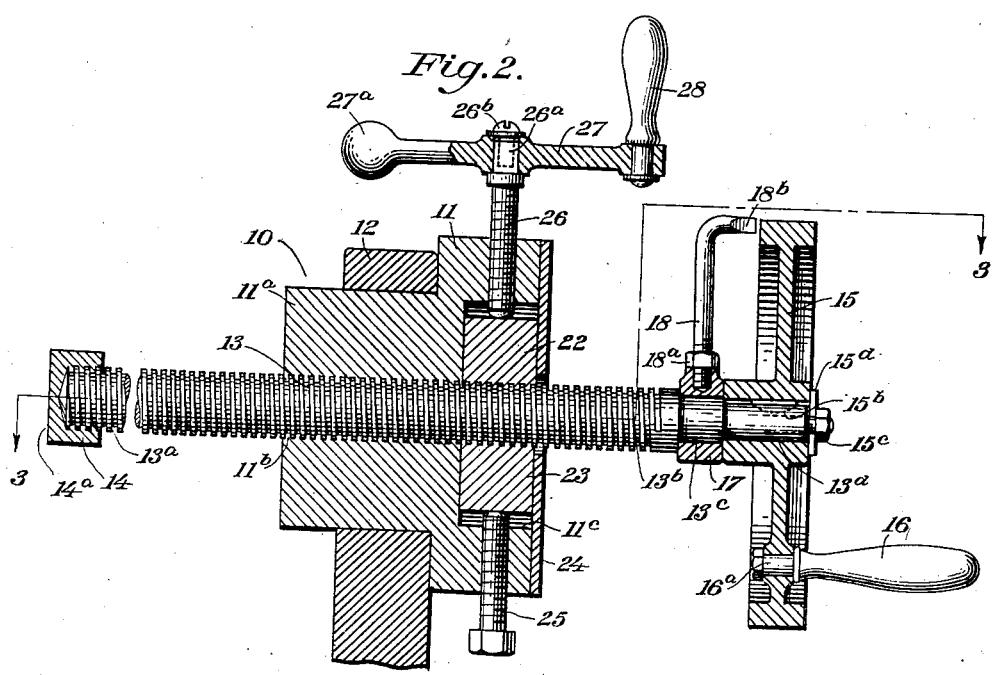

Referring then to the drawings,

Figure 1 is substantially a top plan view of the presently preferred embodiment of this invention showing the device mounted as if in use upon parts of a conventional turret lathe, Fig. 2 is essentially a vertical sectional view of Fig. 1 taken along the plane indicated by the line 2—2, Fig. 3 is a top plan view partially in section of the device illustrated in Fig. 2, the section being taken along the line 3—3, Fig. 4 is essentially a vertical sectional view of Fig. 3 in the plane indicated by the line 4—4 of Fig. 3, Fig. 5 is essentially a vertical sectional view of Fig. 3 in the plane indicated by the line 5—5, and Fig. 6 is a perspective view partially broken away of a modified form of stop forming part of the device illustrated in the foregoing figures.

Referring now particularly to Figs. 2 to 5 inclusive, it will be noted that the novel adjustable stop mechanism according to this invention generally designated by the reference character 10 comprises a block 11 substantially circular in vertical cross-sectional outline and having a diminished end portion 11a receivable within a split ring holder 12 by means of which the block can be held in the tool holder of a conventional lathe. The block may be regarded as an annulus inasmuch as an opening 11b extends horizontally axially therethrough, the opening terminating in a substantially larger opening 11c located in the end of the block opposite to the diminished end 11a hereinabove referred to. The opening 11c is essentially rectangular in vertical cross-sectional outline and serves to receive parts of the device as hereafter will be described.

A threaded rod 13 received within a threaded opening 11b is of a length such that end portions 13a and 13b thereof project below the block 11 substantially as shown. It is to be understood that appropriate threading such as Acme threading is used upon both block and rod to assure a precise feeding between the parts essentially free from play productive of lost motion or back lash. The end 13a of the rod 13 carries a stop plate 14 having a flat face 14a perpendicular to the axis of the rod 13. The stop plate is affixed upon the end of the rod by means of a threaded socket engaging with the threads on the rod.

The opposite end of the rod 13 is provided with a first diminished portion 13c and a second diminished portion 13d nearest the extreme end of the rod. The wheel 15 provided with peripheral calibrations generally designated by the reference character 15a is mounted upon the second diminished portion 13d of the rod 13, and a handle 16 connected to the wheel by fastening means 16a is provided to facilitate rotation of the wheel as will be obvious from an inspection of the drawings. The wheel 15 is locked with respect to the rod 13 by means of a key 15b engaging with a keyway formed in both the wheel and the diminished end of the rod, and a nut 15c and washer 15d carried on threaded end portions of the rod 13 serve to hold the wheel fixed in place and to press parts of the wheel against a portion 13c of the rod.

A collar 17 freely rotatably mounted upon the diminished portion 13c of the rod 13 is pressed between parts of the rod and the wheel 15 in a manner such that axial movement of the collar along the rod is substantially precluded. An upstanding arm 18 mounted in a threaded socket formed in parts of the collar 17 and held rigidly in place by means of a lock nut 18a is bent near its distal end to provide a pointed index 18b which, positioned near the calibrations 15a of the wheel 15, serves to facilitate setting of the wheel at a selected position. An arm 17a integrally formed with the collar 17 and extending radially outwardly therefrom is provided with an opening near its distal end wherein is received a threaded end portion 19a of a scale 19, the scale end portion being held rigidly in place by means of lock nuts 19b. The scale 19 which is provided with calibrations having relation to axial motion of the rod 13 produced by rotation of the rod with respect to the block 11 extends in spaced parallelism with respect to the rod and is received in an opening formed in the block for the purpose. An index 20 mounted by means of a screw 21 on the face of the block 11 serves to facilitate adjustment of the position of the rod 13 when considered in connection with the calibrations appearing on the scale 19.

A pair of blocks 22 and 23 freely slidingly received within the rectangular opening 11c formed in the face of the block 11 and retained therein by means of a plate 24 attached to the face of the block by appropriate fastening means 24a are provided upon the opposed faces thereof with threading similar to the threading of the opening 11b of the block 11, it being understood however that the end portions 22a and 23a of the blocks 22 and 23 respectively do not abut against each other when the blocks are pressed against the threaded rod 13. As will be apparent to those skilled in this art, pressing of the blocks 22 and 23 against the threaded rod 13 will inhibit, restrict and control rotation of the rod with respect to the block 11. A screw 25 received in a tapped opening formed in the block 11 abuts against the block 23 in a manner such as to facilitate pressing of the block 23 against the threaded rod 13b and in like manner a screw 26 bears against the threaded rod 13. By appropriate adjustment of the screws 25 and 26 the oppositely pressing blocks 22 and 23 can be made to hold against or to release for rotation relative to the block 11 the threaded rod 13. An arm 27 having an irregularly shaped opening formed therein engaging with an irregularly shaped end portion 26a of the screw 26 and held thereon by fastening means 26b is provided with a handle 28 and weighted end 27a for facilitating adjustment of the screw 26 for the purpose hereinabove described.

In Fig. 6 is illustrated a stop plate generally designated by the reference character 29 having a plane face 29a and a threaded socket 29d for receiving and engaging with an end portion of the threaded rod 13 above described. This stop plate is intended to be used in conjunction with the afore described device as a substitute for the plate 14 hereinbefore mentioned. The plate 29 is especially useful as a cutoff stop when the machine is using tubular stock since otherwise the stock might receive within its interior the stop 14.

In use the device is mounted upon the turret generally designated by the reference character A in Fig. 1 of a lathe, the turret sliding on ways B to permit adjustment with respect to the chuck C within the work D. As the stock is fed from the chuck C, it moves along the axis of rotation of the chuck until it abuts against the stop plate of the device hereinbefore described which, in the instance illustrated in Fig. 1, is the stop plate 14. It is to be understood that the stop plate has been adjusted to provide the desired length of cutoff stock between a cutoff plate E′ of the cutoff device E and the face of the stop plate. The calibrations on the sliding scale 19 and the peripheral calibrations 15a of the wheel serve to permit immediate and exact increase or decrease of the length of the pieces cut off without requiring the use of scales and calipers as has heretofore been necessary.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. An adjustable stock cutoff stop suited for use upon a turret lathe comprising a block having a tapped opening extending axially therethrough, adapted to be firmly but removably mounted in a lathe tool holder; a freely rotatable threaded rod mounted in and engaging with the threaded opening in said block, the ends of said rod projecting from said block; a stock stop on one end of said rod; a peripherally calibrated wheel rigidly mounted on the opposite end of said rod; a scale slidingly mounted in said block connected to and movable conjontly with said rod and indexes for said scale on said peripherally calibrated wheel whereby setting of the rod to a selected position is facilitated.

2. An adjustable cutoff stop suited for use on a turret lathe comprising a block having a tapped opening extending axially therethrough, adapted to being firmly but removably mounted in a lathe tool holder; a freely rotatable threaded rod mounted in and engaging with the threaded opening in said block, the ends of said rod projecting from said block; a stop on one end of said rod; a peripherally calibrated wheel rigidly mounted on the opposite end of said rod; a collar freely rotatably mounted on said rod near said wheel in a manner such that motion of the collar axially along the rod is precluded, a radially extending arm integrally formed on said collar, an index pointer on said collar cooperating with the calibrated periphery of the wheel to permit setting of the wheel to a selected position; a scale, mounted in said blocks in a manner permitting free longitudinal sliding motion in a direction parallel to the axis of motion of said rod connected to the distal end of said arm; and an index pointer mounted on said block cooperating with said scale whereby setting of the rod to a preselected position in its longitudinal motion is facilitated.

3. An adjustable stock cutoff stop suited for use on a turret lathe comprising a block having a tapped opening extending axially therethrough, adapted to being freely but removably mounted in a lathe tool holder; a freely rotatable threaded rod mounted in and engaging with the threaded opening in said block, the ends of said rod projecting from said block; a stop on one end of said rod; a peripherally calibrated wheel rigidly mounted on the opposite end of said rod; a collar freely rotatably mounted on said rod near said wheel in a manner such that motion of the collar axially along the rod is precluded; a radially extending arm integrally formed on said collar, an index pointer on said collar cooperating with the calibrated periphery of the wheel to permit setting of the wheel to a selected position; a scale, mounted in said block in a manner permitting free longitudinal sliding motion in a direction parallel to the axis of motion of said rod connected to the distal end of said arm; an index pointer mounted on said block cooperating with said scale whereby setting of the rod to a preselected position in its longitudinal motion is facilitated; and means for clamping said rod against rotation.

4. An adjustable stock cutoff stop suited for use upon a turret lathe comprising a block, substantially cylindrical in cross-sectional outline and having a tapped opening extending axially therethrough, adapted to being firmly but removably mounted in a lathe tool holder; a freely rotatable threaded rod mounted in and engaging with the threaded opening in said block, the ends of said rod projecting from said block; a stop on one end of said rod, said stop comprising a tapped socket receivable upon and engageable with one end of said rod and a plate, integral with said socket, presenting a flat surface extending in a plane perpendicular to the axis of said rod; a peripherally calibrated wheel rigidly mounted on the opposite end of said rod, a projecting handle on said wheel for facilitating manual rotation thereof; a collar freely rotatably mounted on said rod near said wheel in a manner such that motion of the collar axially along the rod is precluded, a radially extending arm having an opening therein near the distal end thereof integrally formed on said collar, an index pointer mounted on said collar cooperating with the calibrated periphery of the wheel to permit setting of the wheel to a selected position; a scale, mounted in said block in a manner permitting free longitudinal sliding motion in a direction parallel to the axis of motion of said rod, received in the opening formed in the distal end of said arm; an index pointer mounted on said block cooperating with said scale whereby setting of the rod to a preselected position in its longitudinal motion is facilitated; means for clamping said rod against rotation comprising opposed jaws slidingly mounted in parts of said block having threaded recessed faces engageable with the threaded rod, and means for pressing said jaws toward each other comprising screws mounted in said block bearing against parts of said jaws.

DAVID FIELD.